United States Patent
Turcot et al.

(10) Patent No.: US 10,014,883 B2
(45) Date of Patent: Jul. 3, 2018

(54) RADIO FREQUENCY TRANSMITTERS HAVING REDUNDANT SIGNAL PATHS AND MONITORING CIRCUITRY FOR DETECTING SIGNAL LOSS

(71) Applicant: CommScope, Inc. of North Carolina, Hickory, NC (US)

(72) Inventors: Michel Turcot, St.-Laurent (CA); Andre Lessard, St.-Eustache (CA); Yves Tardif, Montreal (CA); Robert Meunier, Ste.-Thérèse (CA)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 14/843,071

(22) Filed: Sep. 2, 2015

(65) Prior Publication Data

US 2016/0373139 A1    Dec. 22, 2016

Related U.S. Application Data

(60) Provisional application No. 62/182,015, filed on Jun. 19, 2015.

(51) Int. Cl.
*H04B 1/38* (2015.01)
*H04B 1/00* (2006.01)

(52) U.S. Cl.
CPC .................. *H04B 1/0007* (2013.01)

(58) Field of Classification Search
CPC .................................................. H04B 1/0003
USPC ....................................................... 375/219
See application file for complete search history.

(56) References Cited

U.S. PATENT DOCUMENTS

| | | | | |
|---|---|---|---|---|
| 3,869,564 A | * | 3/1975 | Colodny | H04N 7/104 348/706 |
| 4,075,440 A | * | 2/1978 | Laubengayer | H04B 1/745 340/2.1 |
| 5,893,024 A | * | 4/1999 | Sanders | H04N 7/102 348/E7.052 |
| 7,379,717 B1 | * | 5/2008 | Haab | H04B 1/48 455/126 |
| 2006/0121873 A1 | * | 6/2006 | Ammar | G01K 11/006 455/326 |
| 2007/0120619 A1 | * | 5/2007 | Kearns | H01P 1/15 333/103 |

(Continued)

OTHER PUBLICATIONS

Disclosure of Prior Sales Activities, executed by D. Randal Ayers (attorney for Applicants) on Jan. 11, 2018.

*Primary Examiner* — Lihong Yu
(74) *Attorney, Agent, or Firm* — Myers Bigel, P.A.

(57) ABSTRACT

Radio frequency ("RF") transmitters include a digital-to-RF electronics module that receives an input data stream and outputs an RF signal, a switch having a first input port that is coupled to an output of the digital-to-RF electronics module, a second input port that is coupled to a matched termination, and an output port that is coupled to a communications network, a DC injection circuit that is configured to inject a DC signal at a first node on an RF transmission path that connects the output of the digital-to-RF electronics module to the first input port of the switch, and a DC monitoring circuit that is configured to sense if a DC signal is present on a second RF transmission path that connects the output of the switch to the communications network.

17 Claims, 10 Drawing Sheets

(56) References Cited

U.S. PATENT DOCUMENTS

2009/0323786 A1* 12/2009 Buer .................. H04B 1/74
                                              375/220
2012/0226929 A1*  9/2012 Lee ................. G06F 11/3041
                                              713/340
2014/0101711 A1*  4/2014 Rakib ............... H04N 21/6118
                                              725/129

* cited by examiner

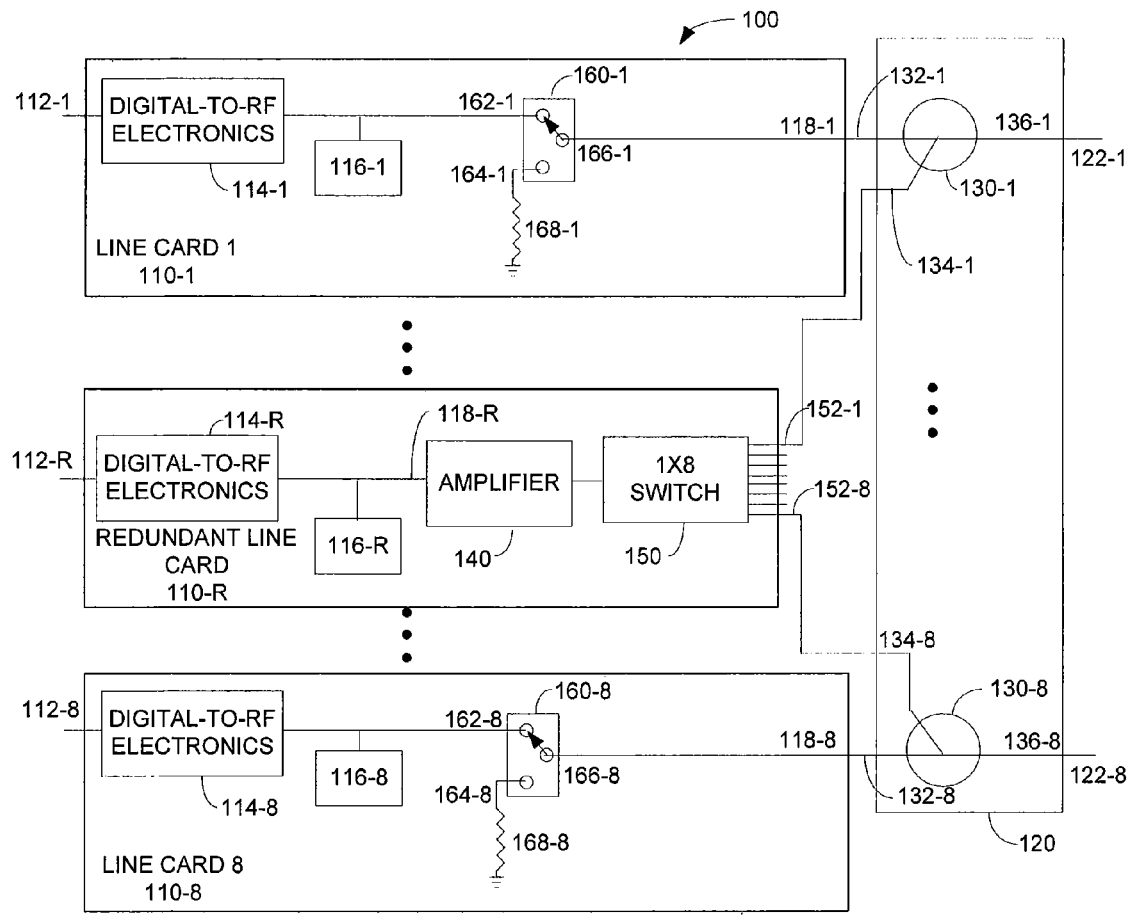
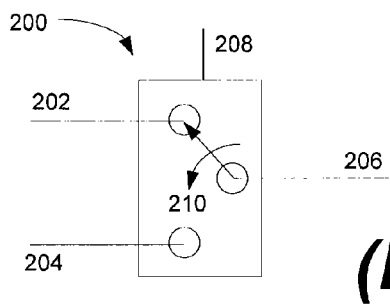
FIG. 1
*(Prior Art)*
FIG. 2
*(Prior Art)*

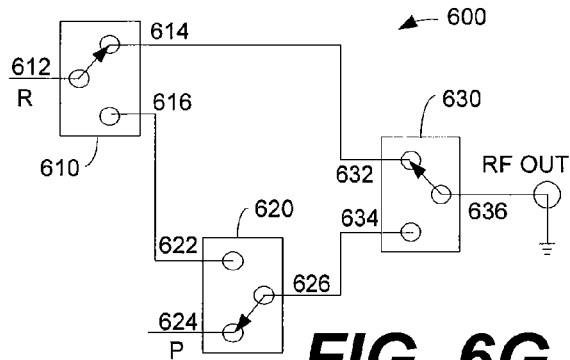
FIG. 6G
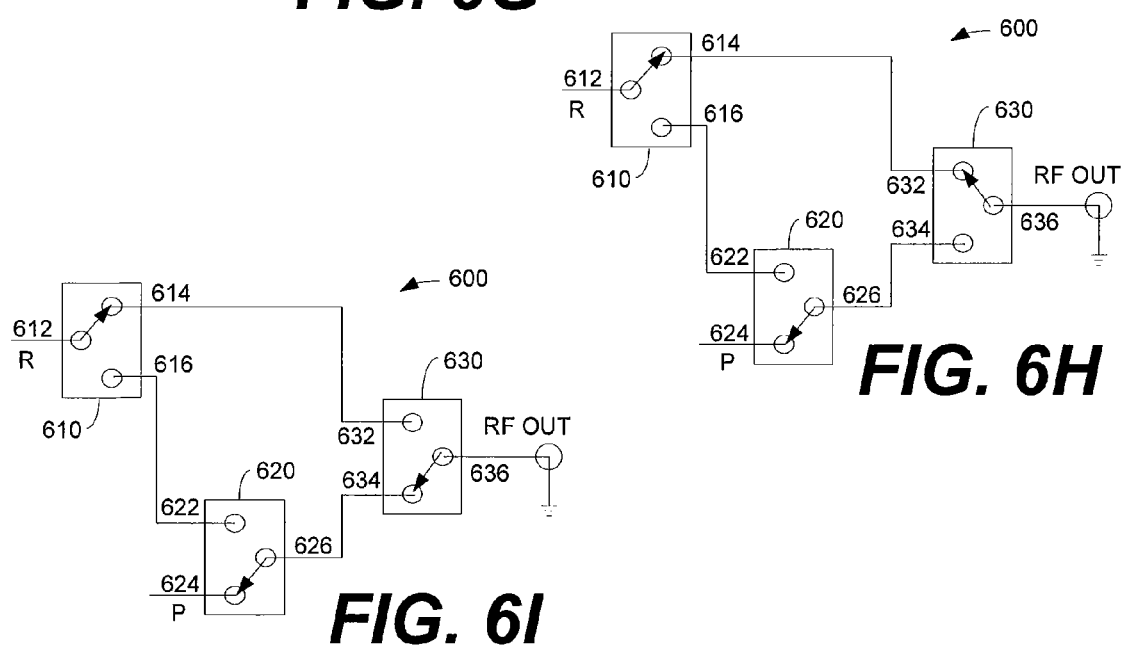
FIG. 6H
FIG. 6I
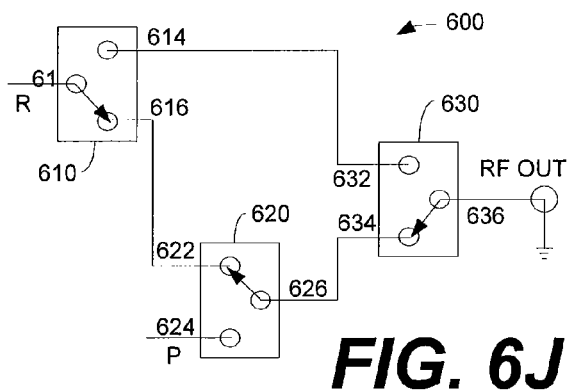
FIG. 6J

RADIO FREQUENCY TRANSMITTERS HAVING REDUNDANT SIGNAL PATHS AND MONITORING CIRCUITRY FOR DETECTING SIGNAL LOSS

CROSS REFERENCE TO RELATED APPLICATION

The present application claims priority under 35 U.S.C. § 119 to U.S. Provisional Patent Application Ser. No. 62/182,015 filed Jun. 19, 2015, the entire content of which is incorporated by reference herein in its entirety.

FIELD OF THE INVENTION

The present invention generally relates to radio frequency ("RF") communications and, more particularly, to transmitters that are used to transmit RF signals.

BACKGROUND

A cable television network is a known type of communications network that is used to transmit information between a service provider and a plurality of subscriber premises, typically over fiber optic and/or coaxial cables. The service provider may offer, among other things, cable television, broadband Internet and Voice-over-Internet Protocol ("VoIP") digital telephone service to subscribers within a particular geographic area. The service provider transmits "downstream" signals from the headend facilities of the cable television network to the subscriber premises. "Upstream" signals may also be transmitted from the individual subscriber premises back to the headend facilities. In the United States, the downstream signals are typically transmitted in the 54-1002 MHz frequency band. The upstream signals are typically transmitted in the 5-42 MHz frequency band.

The headend facilities of the cable television network include a large number of RF transmitters that modulate the downstream data onto RF carrier signals for transmission to the subscriber premises. The downstream data may include, for example, broadcast digital television signals, video-on-demand program content, Internet traffic, VoIP telephone signals and the like. The RF transmitters that are used to transmit this downstream data onto the cable television network infrastructure may comprise, for example wideband Quadrature Amplitude Modulation ("QAM") transmitters that may support one hundred or more QAM channels per RF port. One conventional RF transmitter that may be used in these networks is the Universal Wideband Edge QAM transmitter offered by CommScope, Inc. of Hickory, N.C. The Universal Wideband Edge QAM transmitter has sixteen RF ports and supports 160 QAM channels per RF port for a total of 2,560 channels per transmitter. An international telecommunications standard known as the Data Over Cable Service Interface Specification ("DOCSIS") specifies standardized parameters for high bandwidth data transfer over cable television networks. Under DOCSIS 3.0, the above referenced channels and the signals transmitted over these channels were referred to as QAM signals and QAM channels. Under DOCSIS 3.1, the QAM channel is now referred to as an SC-QAM channel, where "SC" stands for "single carrier." DOCSIS 3.1 also supports an orthogonal frequency division multiplexing ("OFDM") channel that is based on multiple QAM channels, and this OFDM channel is sometimes referred to as a "Multi-Carrier QAM channel," which is why the normal QAN channels are now referred to as SC-QAM channels.

Subscribers of cable television, Internet and VoIP services may be very demanding, and may find even occasional service outages to be unacceptable. Many business subscribers rely heavily on their Internet and VoIP service to conduct their daily operations, and hence even short service outages can have significant impact on such subscribers. Accordingly, service providers are under increased pressure to reduce the incidences of service outages and to reduce the length of any service outages that occur.

SUMMARY

Pursuant to embodiments of the present invention, RF transmitters are provided that include a digital-to-RF electronics module that is configured to receive an input data stream and output an RF signal containing at least some of the input data stream and a switch having a first input port that is coupled to an output of the digital-to-RF electronics module, a second input port that is coupled to a matched termination, and an output port that is coupled to a communications network. These transmitters further include a DC injection circuit that is configured to inject a DC signal at a first node on an RF transmission path that connects the output of the digital-to-RF electronics module to the first input port of the switch and a DC monitoring circuit that is configured to sense if a DC signal is present on a second RF transmission path that connects the output of the switch to the communications network.

In some embodiments, the RF transmitters may further include a first DC block capacitor between the output of the digital-to-RF electronics module and the first node and/or a second DC block capacitor between the second node and the communications network. The DC injection circuit may generate a reference DC voltage that is input to the DC monitoring circuit along a reference voltage transmission path. The DC monitoring circuit may include a Schmidt trigger inverter. The digital-to-RF electronics module, the switch, the DC injection circuit and the DC monitoring circuit may all be implemented on a first primary line card, and the RF transmitter may include a plurality of additional primary line cards, each of which may include a separate DC injection circuit and a separate DC monitoring circuit. The switch may be an RF relay and the matched termination may comprise a resistance that is coupled to a ground voltage, where a value the resistance may be selected to set an impedance at the output of the switch to a pre-selected level.

Pursuant to additional embodiments of the present invention, methods of monitoring an RF relay are provided in which an RF transmission path is provided between an output of an RF source and a switch, and an RF signal is output from the RF source onto this first RF transmission path. A DC signal may also be injected onto the RF transmission path. The RF signal and the DC signal may be passed through the switch. Monitoring may then be performed for the presence of the DC signal at the output of the switch.

In some embodiments, the RF source may comprise a line card of a quadrature amplitude modulation transmitter. The switch may be an RF relay. The method may further include passing a reference DC voltage that is generated from the DC signal to a DC monitoring circuit that monitors for the presence of the DC signal along a reference voltage transmission path that is separate from the RF transmission path.

Pursuant to additional embodiments of the present invention, RF transmitters are provided that include a first switch having an input coupled to a first RF source, a first output coupled to a first node and a second output coupled to a second node, a second switch having a first input coupled to a second RF source, a second input coupled to the second node and an output coupled to a third node, and a third switch having a first input coupled to the first node, a second input coupled to the third node, and an output.

In some embodiments, the first RF source may be a primary RF source and the second RF source may be a redundant RF source. The first, second and third switches may be controlled by respective control signals. The RF transmitter may comprise a quadrature amplitude modulation transmitter that includes a plurality of primary line cards and a redundant line card. The RF transmitter may also include a DC injection circuit that is configured to inject a DC signal between the first RF source and the input to the first switch and a DC monitoring circuit that is coupled to an output of the third switch.

Pursuant to yet additional embodiments of the present invention, RF transmitters are provided that include a primary line card having a first RF output, a redundant line card having a second RF output, a first switch having an input coupled to the first RF output, a first output coupled to a first node and a second output coupled to a second node, a second switch having a first input coupled to the first node, a second input coupled to a third node and an output coupled to a fifth node, a third switch having an input coupled to the second RF output, a first output coupled to the third node and a second output coupled to a fourth node, a fourth switch having a first input coupled to the second node, a second input coupled to the fourth node and an output coupled to a sixth node, and a fifth switch having a first input coupled to the fifth node, a second input coupled to the sixth node and an output.

In some embodiments, the RF transmitter may further include a DC injection circuit that is configured to inject a DC signal between the first RF output and the input to the first switch and a DC monitoring circuit that is coupled to an output of the fifth switch. The RF transmitter may also include a switching circuit between the second RF output and the third switch, where the switching circuit has at least two RF paths that connect the second RF output to the input of the third switch.

BRIEF DESCRIPTION OF THE DRAWINGS

FIG. 1 is a schematic block diagram of a conventional RF transmitter.

FIG. 2 is a schematic block diagram of a conventional relay.

FIGS. 6A-6J are block diagrams showing various switch positions for the relays in the switch circuit of FIG. 6 that may be used to overcome failures of one the relays in the switch circuit.

DETAILED DESCRIPTION

Figure 3:
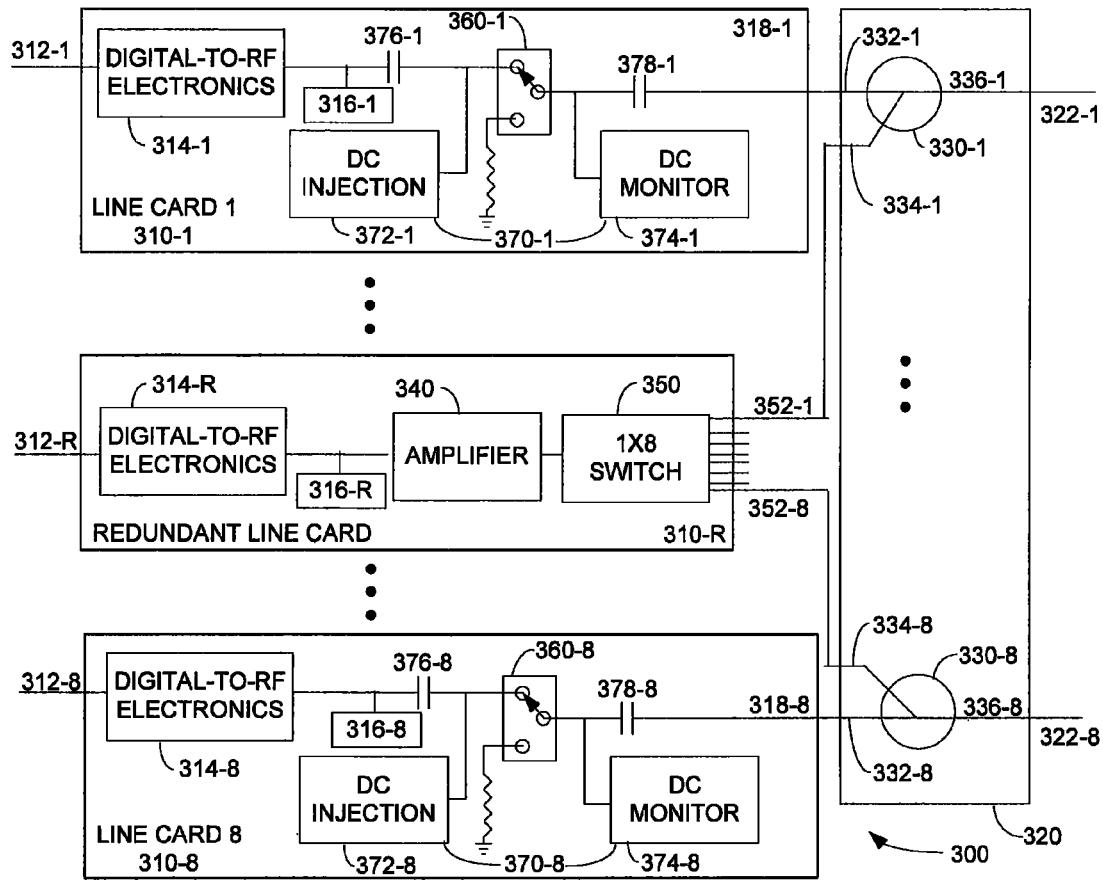
FIG. 3 is a schematic block diagram of an RF transmitter according to embodiments of the present invention.

In order to reduce service outages in a cable television network, the downstream RF signals that are transmitted from the headend facilities may be monitored to identify situations where equipment failures or other problems result in the loss of the downstream RF signals. By monitoring the downstream RF signals, any outages may be quickly identified and addressed so that the length of any losses in service may be reduced or minimized. Unfortunately, RF signals may be very sensitive, and hence efforts to monitor RF signals may potentially degrade the RF signals. Accordingly, a tradeoff may exist between signal quality and the amount of RF signal monitoring that is performed.

One potential point of failure in cable television networks are the "line cards" that are included in the RF transmitters at the headend facilities. A line card refers to a module that typically includes a printed circuit board with electronic circuits mounted thereon that interfaces with a telecommunications access network. A line card may, for example, receive encapsulated digital data from, for example, a server, de-packetize and reformat this digital data into packets, map the packets onto a QAM channel (or SC-QAM channel), and perform QAM modulation and frequency up-conversion to an appropriate RF frequency to transmit the received data onto the cable television network cabling infrastructure. The RF transmitters in use today typically include a plurality of line cards (e.g., eight, ten, sixteen or more), each of which may have multiple input ports and multiple RF output ports. Accordingly, a single RF transmitter can receive digital data through dozens of input ports and support thousands of QAM channels. These RF transmitters may also include one or more redundant line cards, and may be configured to switch over to one of these redundant line cards if one of the primary line cards fails.

In some RF transmitter designs, a switch such as an RF relay may be provided in, for example, an RF backplane of the transmitter that is used to selectively connect either an output port of a primary line card or an output port of a redundant line card to the cable television network cabling infrastructure. In other RF transmitter designs, these switches may be replaced with directional couplers in the RF backplane, where each directional coupler has a first input that is connected to an output port of a primary line card and a second input port that is connected to an output port of a redundant line card, and an output port that is connected to the cable television network cabling infrastructure. In this second type of RF transmitter design, a primary line card will normally feed the downstream RF signal to each respective directional coupler, but if one of the primary line cards fails, then the redundant line card is used to replace the failed primary line card, and the downstream RF signal is fed to the second input port of the directional coupler that is coupled to the failed primary line card via the redundant line card.

In the second RF transmitter design discussed above that includes directional couplers in the RF backplane, a "matched termination" relay may be provided along each RF signal path that connects a primary line card to the first input port of the respective directional couplers in the RF backplane. Each of these matched termination relays has a first input port that is connected to the RF output of the line card electronics on a respective one of the primary line cards, a second input port that is connected to ground through a matched termination, and an output port that is coupled to the first input port of a respective one of the directional couplers. During normal operation, the matched termination relay is set to connect the RF output of the line card electronics to the first input port of the directional coupler so that the primary line card may transmit downstream RF signals onto the cable television network cabling infrastructure. If, however, the primary line card fails, its corresponding matched termination relay switches to connect the output port thereof to the matched termination so that the failed primary line card will not be part of the RF signal path. By removing the failed primary line card from the RF signal path and connecting the first input port of the directional coupler to a matched termination, an impedance mismatch may be reduced or prevented at the directional coupler that, if present, may degrade the RF signals from the redundant line card that are transmitted though the directional coupler.

While RF relays generally have good reliability, they still may fail on occasion. Failure of one of the RF relays in the RF backplane in the first RF transmitter design discussed above or failure of one of the matched termination relays in the second RF transmitter design discussed above may result in a service outage. Moreover, while operation of the primary line cards in an RF transmitter may be monitored using an RF power detector that is located at the RF output of the line card electronics, such RF power detectors are located along the RF signal path before either the RF backplane or the matched termination relays. Consequently, if one of the above-discussed RF relays fails, this failure may not be detected as the RF power measured at the output of the line card electronics may have a normal reading, but the RF signal is not passed to the RF output port because of the failed relay. In such situations, the service provider may not identify the failure until customer complaints are received and investigated. This may result in long outages that are generally considered to be unacceptable.

Pursuant to embodiments of the present invention, RF transmitters are provided that include circuitry that may be used to monitor the operation of the above-described matched-termination relays so as to quickly and automatically identify situations when these relays fail. In some embodiments, this circuitry may comprise a direct current ("DC") signal generator that is used to inject a DC signal at one side of the matched termination relay and a DC signal detector that is connected to the communications path at the other side of the matched termination relay. The DC signal generator may be used to inject a low voltage DC signal onto the RF signal path on a first side of the relay. The DC signal will generally not interfere with the RF signals on the RF signal path. The DC monitoring circuit is configured to sense whether the DC signal is present on the opposite side of the relay. Capacitors may be provided that block the injected DC signal from travelling to either the primary line card or to the RF backplane. As a failure of the matched termination relay will block both RF and DC signals, so long as the DC signal is detected at the DC signal detector, it can be concluded that the matched termination relay is operating properly. If the DC signal is not detected at the DC signal detector, an alarm may be raised. In some embodiments, the RF transmitter may automatically switch from a primary line card to a redundant line card if the DC signal is not detected at the DC signal detector in order to reduce subscriber downtime to as little as milliseconds.

In other embodiments, the DC signal detector may be located in the RF backplane on the downstream side of any RF relays included in the RF backplane. In such embodiments, the DC signal detector may also or alternatively be used to detect the failure of relays in the RF backplane.

In still further embodiments, RF transmitters may be provided that include enhanced switch systems in, for example, the RF backplanes thereof, that are used to selectively connect either a primary line card or a redundant line card to each RF output port. These enhanced switch systems may include multiple switches that are interconnected in a manner that can allow the switch system to still operate properly even if one of the switches fails.

Embodiments of the present invention will now be discussed in further detail with reference to the attached drawings.

FIG. 1 is a schematic block diagram of a conventional RF transmitter 100. As shown in FIG. 1, the RF transmitter 100 includes a plurality of primary line cards 110-1 through 110-8. Only two of the primary lines cards, (line cards 110-1 and 110-8) are depicted in FIG. 1 in order to simplify the drawing. Herein, when an RF transmitter or a component thereof includes multiple of the same element, the reference numeral that refers to these elements may have a base number (e.g., 110) that is common for all of the like elements and a secondary number (e.g., -1, -2, etc.) that refers to specific instances of the elements. These like elements may be referred to collectively herein by their base number (e.g., the primary line cards 110) or by their full reference numeral (e.g., primary line card 110-3) to identify a specific one of the like elements. Each primary line card 110 may comprise, for example, a module that is received within the housing or chassis of the RF transmitter 100. Each primary line card 110 may include a printed circuit board with integrated circuit chips mounted thereon that perform the functionality of the primary line card 110, as described below.

Each primary line card 110 includes an input port 112 and an output port 118. While not shown in FIG. 1 to simplify the drawing, each primary line card 110 may include more than one input port 112 and more than one output port 118. For example, in some embodiments, each primary line card 110 may include two input ports 112 and two output ports 118. In other embodiments, each primary line card 110 may include six or eight input ports 112 and six or eight corresponding output ports 118. Other numbers of input ports 112 and output ports 118 may be included on the primary line cards 110 in other embodiments.

Each primary line card 110 may also include a digital-to-RF electronics module 114 and an RF power detector 116. The digital-to-RF electronics module 114 may comprise circuitry that is configured to receive encapsulated baseband digital data that is to be transmitted over the cable television network and to output an RF signal that includes the digital data. In some embodiments, the digital-to-RF electronics modules 114 may comprise an application specific integrated circuit chip ("ASIC") that is configured to receive digital data, de-packetize the data and/or reformat the data into new data packets, map the digital data packets onto a QAM channel (or SC-QAM channel), perform QAM modulation and frequency up-convert the modulated QAM data for transmission as an RF signal. The RF signal may be amplified to an appropriate power level by, for example, a high power amplifier that is part of the digital-to-RF electronics module 114. The digital-to-RF electronics module 114 may also perform other functions such as signal filtering, error correction coding, interleaving and the like. Each digital-to-RF electronics module 114 may output an RF signal that is suitable for transmission over a cable television network cabling infrastructure. The RF power detector 116 is configured to sense the output of each digital-to-RF electronics module 114 and may detect, for example, either a level of the RF signal output by the digital-to-RF electronics module 114 or the presence of an RF signal.

As is further shown in FIG. 1, the RF transmitter 100 also may include at least one redundant line card 110-R. The redundant line card 110-R may be used in the event that one of the primary line cards 110 fails. The redundant line card 110-R includes a digital-to-RF electronics module 114-R, a power detector 116-R, an amplifier 140, and a 1×8 RF switch 150. The digital-to-RF electronics module 114-R and the power detector 116-R may be identical to the digital-to-RF electronics module 114 and power detectors 116, respectively, that are included on the primary line cards 110 that are described in detail above, and hence further description thereof will be omitted. The 1×8 RF switch 150 may comprise, for example, seven 1×2 RF switches such as electronic switches or mechanical relays that are configured to output an RF signal that is input to the RF switch 150 to one of eight output ports 152-1 through 152-8. The amplifier 140 may be provided to amplify the RF signal output by the redundant line card 110-R to compensate for the signal loss in the RF switch 150.

The RF transmitter 100 further includes an RF backplane 120. The RF backplane 120 may be part of the RF transmitter 100 as shown in FIG. 1, or may be a separate unit. The RF backplane 120 includes eight directional couplers 130-1 through 130-8. Each directional coupler 130 includes a first input port 132, a second input port 134 and an output port 136. The RF backplane 120 has eight RF output ports 122-1 through 122-8. The output port 136 of each directional coupler 130 is connected to a respective one of these RF output ports 122. The RF output port 118 of each primary line card 110 is received at the first input port 132 of a respective one of the directional couplers 130. The second input port 134 of each directional coupler 130 may receive a respective one of the output ports 152 of the 1×8 RF switch 150. The RF transmitter 100 is designed so that an RF signal will only be provided to one of the two input ports 132, 134 of each directional coupler 130. The RF signal that is input at one of the input ports 132, 134 of a directional coupler 130 is passed to the output port 136 thereof. As each directional coupler 130 only receives an RF signal at one of its two input ports 132, 134, the directional coupler 130 functionally acts as a 2×1 switch that connects either an output port 118 of a primary line card 100 or the output port 118-R of the redundant line card 110-R to a respective one of the output ports 122 of the RF backplane 120. Directional couplers 130 may be preferred over 2×1 switches in some transmitters because directional couplers are passive (i.e., non-powered) devices that for all practical purposes never fail, whereas electronic switches and mechanical relays that could be used in place of the directional couplers 130 may fail on occasion.

The directional couplers 130, however, introduce an insertion loss along each RF signal path, which may be, for example, as high as 6-7 dB.

Under normal operating conditions, the redundant line card 110-R will not be in operation, and each primary line card 110 will output an RF signal from its respective output port 118 to a corresponding one of the directional couplers 130 in the RF backplane 120. Each directional coupler 130 passes the RF signal received at the input port 132 thereof to a respective one of the RF output ports 122 of the RF backplane 120. Typically, the RF signals output from the RF backplane 120 are then passed to an optical unit (not shown) for conversion into optical signals that are suitable for transmission over the cable television network.

As noted above, the RF power detectors 116 that are included in each primary line card 110 may detect the power levels of the RF signals that are output by the respective digital-to-RF electronics modules 114. If one of the digital-to-RF electronics modules 114 fails, the RF power detector 116 associated with the failed digital-to-RF electronics module 114 will detect the absence of RF power at the output thereof and notify a controller (not shown) of the RF transmitter 100. In response to such a failure, the controller may activate the redundant line card 110-R to replace the failed primary line card 110 by (1) switching the baseband digital data feed so that it is provided to the input port 112-R of the redundant line card 110-R instead of being provided to the input port 112 of the failed primary line card 110 and (2) configuring the 1×8 RF switch 150 so that the RF signal that is output by the redundant line card 110-R is routed to the second input port 134 of the directional coupler 130 that is associated with the failed primary line card 110.

In order to minimize losses, the RF signal path from the output of each digital-to-RF electronics module 114 to the output port 136 of the corresponding directional coupler 130 will be designed to have a pre-selected impedance level such as 50 ohms or 75 ohms. So long as the input ports 132, 134 to the directional couplers 130 exhibit this pre-selected impedance level, then reflection losses within the directional couplers 130 can be reduced or minimized. However, if one of the primary line cards 110 fails, it is impossible to know in advance what impedance will be seen at the output of the failed primary line card 110. If this indeterminate impedance varies significantly from the pre-selected impedance, the two input ports 132, 134 to the directional coupler 130 that is associated with the failed primary line card 110 will not have matched impedances, and reflections may be introduced that appear as noise that degrades the RF signal that is input to the directional coupler 130 from the redundant line card 110-R.

In order to prevent such signal losses, each primary line card 110 further includes a switch 160 that is used to terminate the primary line card 110 to a matched termination in the event that the line card 110 fails and the redundant line card 110-R is used in its place. Each switch 160 may comprise, for example, electronic switch or an electromechanical RF relay. As shown, each switch 160 may have a first RF input port 162, a second RF input port 164, and an RF output port 166. The first RF input port 1642 is coupled to the output of the digital-to-RF electronics module 114. The second RF input port 164 is coupled to ground through a matched termination in the form of a resistor 168 having a value that is selected so that the first input port 132 of the directional coupler 130 will be set to the preselected impedance level. For example, the resistor 168 may comprise, for example, a 50 ohm or 75 ohm resistor depending upon the design of the RF transmitter 100. The RF output port 166 is coupled to first input port 132 of a respective one of the directional couplers 130.

FIG. 2 is a schematic block diagram of a conventional relay 200 that may be used to implement the switches 160 of FIG. 1. As shown in FIG. 2, the relay 200 includes a first input port 202, a second input port 204 and an output port 206. The first and second input ports 202, 204 and the output port 206 may be RF transmission lines. The relay 200 further includes a mechanical switching mechanism 210 that may selectively electrically connect the output port 206 to one of the first and second input ports 202, 204. The mechanical switching mechanism 210 may be controlled by a control signal that is received at a control port 208 of the relay 200. In other words, a control signal received at port 208 may determine whether the relay connects the output port 206 to the first input port 202 or to the second input port 204. The control port 208 is illustrated in FIG. 2 but is not shown in the other figures to simplify the drawings.

Referring again to FIG. 1, if one of the RF power detectors 116 provides an RF power reading that indicates that its associated digital-to-RF electronics module 114 has failed, the controller (not shown) of the RF amplifier 100 may switch the input data stream from the primary line card 110 that includes the failed digital-to-RF electronics module 114 to the digital-to-RF electronics module 114-R of the redundant line card 110-R. The controller of the RF transmitter 100 may also transmit a control signal to the switch 160 on the failed primary line card 110 to change the position of the switch 160 so that the output port 166 thereof is electrically connected to the second input port 164 having the matched termination resistor 168 connected thereto.

While the electromechanical switches and relays that may be used to implement the switches 160 may be highly reliable devices, they are still subject to failure on occasion. If these switches 160 fail, the RF transmitter 100 may not realize that a failure has occurred, because the switches 160 are downstream of the associated RF power detectors 116, and hence the RF power detectors 116 will provide a normal power reading to the control system of the RF amplifier 100. Thus, a cable television service provider may be unaware of the failure of one of the switches 160 until complaints of service outages are received from subscribers. Moreover, the subscriber complaints will not identify the source of the outage, so the service provider will then need to troubleshoot the system to identify the source of the problem. This can result in inordinate delays that are generally considered to be unacceptable.

As noted above, pursuant to embodiments of the present invention, monitoring systems may be provided that can identify failures of the switches 160 and which can, in some embodiments, automatically and almost instantaneously reconfigure to avert the failure. Various embodiments of the present invention that provide such capabilities will now be discussed.

FIG. 3 is a schematic block diagram of an RE transmitter 300 according to embodiments of the present invention. As shown in FIG. 3, the RF transmitter 300 includes eight primary line cards 310-1 through 310-8. The primary line cards 310 are very similar to the primary line cards 110 discussed above with reference to FIG. 1, except that each line card 310 may further include an RF monitoring circuit 370 that includes a DC injection circuit 372 and a DC monitoring circuit 374 (also referred to herein as a DC signal detector), the design and functionality of which are discussed in detail below. All other components of the primary line cards 310 may be identical to their corresponding components in the primary line cards 110 (and have reference numerals that are offset by 200 from their corresponding components in the line cards 110), and hence further description of these components will be omitted herein.

The RF transmitter 300 also includes a redundant line card 310-R and an RF backplane 320. The redundant line card 310-R and the RF backplane 320 may be identical to the redundant line card 110-R and the RF backplane 120, respectively, that are discussed above with reference to FIG. 1, and hence further description of these components will likewise be omitted here.

As shown in FIG. 3, each line card 310 includes an RF monitoring circuit 370. Each RF monitoring circuit 370 may include a DC injection circuit 372, a DC monitoring circuit 374, and a pair of DC block capacitors 376, 378. The DC injection circuit 372 may comprise a DC signal generator that is coupled to the output of the digital-to-RF electronics module 314. The DC injection circuit 372 may inject a DC signal onto the RF transmission line that connects the output of the digital-to-RF electronics module 314 to the first input of the switch 360. The DC signal may be injected onto the RF transmission line between the output of the RF power meter 316 and the switch 360. The DC block capacitor 376 is coupled between the injection point of the DC signal and the output of the digital-to-RF electronics module 314 to block the injected DC signal from passing into the digital-to-RF electronics module 314. The DC monitoring circuit 374 may be connected to the RF output port of the relay 360, and may sense whether or not a DC signal is present on the transmission line. The DC block capacitor 378 is coupled between the relay 360 and the RF backplane 320, and blocks the injected DC signal from passing into the RF backplane 320.

RF signals are very sensitive to any interaction, and hence measuring an RF signal may inject noise or other distortions into the RF signal. Accordingly, it may be desirable to reduce or minimize the extent to which the RF signal is measured. Conversely, as described above, it may be important to monitor for loss of communication at each stage throughout the RF transmitter 300 to be able to quickly identify when service disruptions arise. The RF monitoring circuit 370 according to embodiments of the present invention operates so that both the RF signal and a DC signal are transmitted through the relay 360. The DC signal generally does not interfere with the RF signal, and the DC block capacitors 376, 378 ensure that the DC signal does not interfere with other equipment within the RF transmitter 300. If the DC signal is detected by the DC monitoring circuit 374, this indicates that the relay 360 is operating normally. If, on the other hand, the DC signal is not detected by the DC monitoring circuit 374, this indicates that the relay 360 is potentially malfunctioning, and an alarm may be raised. The RF transmitter 300 may also be programmed so that upon sensing an absence of a DC signal at the DC monitoring circuit 374 of a primary line card 310 (indicating that the primary line card 310 at issue has potentially failed), the RF transmitter 300 automatically switches the downstream digital data for that primary line card 310 to a redundant line card 310-R, triggers the relay 360 on the potentially failed primary line card 310 to switch to the matched termination resistor, and configures the 1×8 switch 350 on the redundant line card 310-R to feed the downstream data to the directional coupler 330 associated with the potentially failed primary line card 310.

Figure 4:
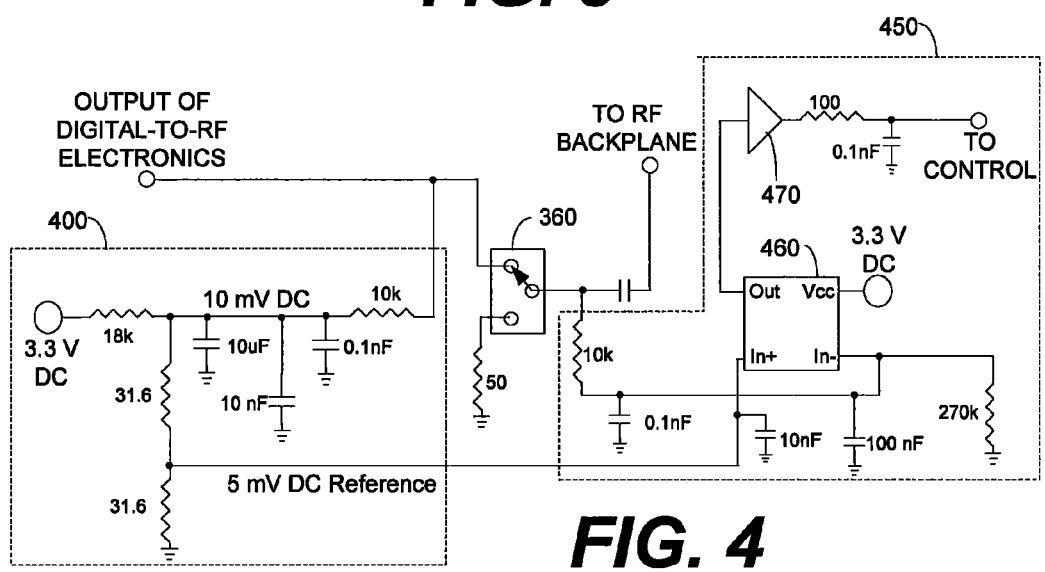
FIG. 4 is a circuit diagram of a DC injection circuit and a DC monitoring circuit according to embodiments of the present invention that may be used in the RF transmitter of FIG. 3.

FIG. 4 is a circuit diagram of a DC injection circuit 400 and a DC monitoring circuit 450 according to embodiments of the present invention that may be used in the RF transmitter of FIG. 3. As shown in FIG. 4, the DC injection circuit 400 uses a 3.3 volt voltage source within the RF transmitter 300 to generate the DC injection signal. A 10 millivolt DC injection signal is generated by passing the 3.3 volt DC signal through an 18,000 ohm resistor. A 5 millivolt DC reference signal is generated by dividing the 10 millivolt DC signal in half. This 5 millivolt DC reference signal is sent to the DC monitoring circuit 450 as a reference signal. If variation occurs on the 3.3 volt voltage source this variation will appear in both the 10 millivolt DC injection signal and in the 5 millivolt DC reference signal and hence the use of the 5 millivolt DC reference signal may minimize the impact of any such variation in the output voltage of the 3.3 volt voltage source. The 10 millivolt DC injection signal is injected onto the RF transmission line that connects the digital-to-RF electronics module 314 to the first input of the relay 360. While a 10 millivolt DC injection signal is used as an example, it will be appreciated that other magnitude DC injection signals may be used. Testing has shown that DC injection signals up to at least 100 millivolts may have negligible impact on the RF signal, and that DC injection signals of 5-10 millivolts have no impact at all on the RF signal.

As is further shown in FIG. 4, the DC monitoring circuit 450 includes an operational amplifier 460 that is used to raise the level of the DC voltage that is passed through the relay 360 to an appropriate voltage level. The output of the operational amplifier 460 is sent to a Schmitt trigger inverter 470. The Schmitt trigger inverter 470 senses whether or not the DC injection signal is present. The output of the Schmitt trigger inverter 470 is sent to the controller (not shown) of the RF transmitter 300. In FIG. 4, all resistor values are in ohms and capacitor values are in nanofarads or microfarads as indicated. Additionally, various of the input ports to the relay 360, the operational amplifier 460 and the Schmidt trigger inverter 470 are not shown in order to simplify FIG. 4.

Figure 5:
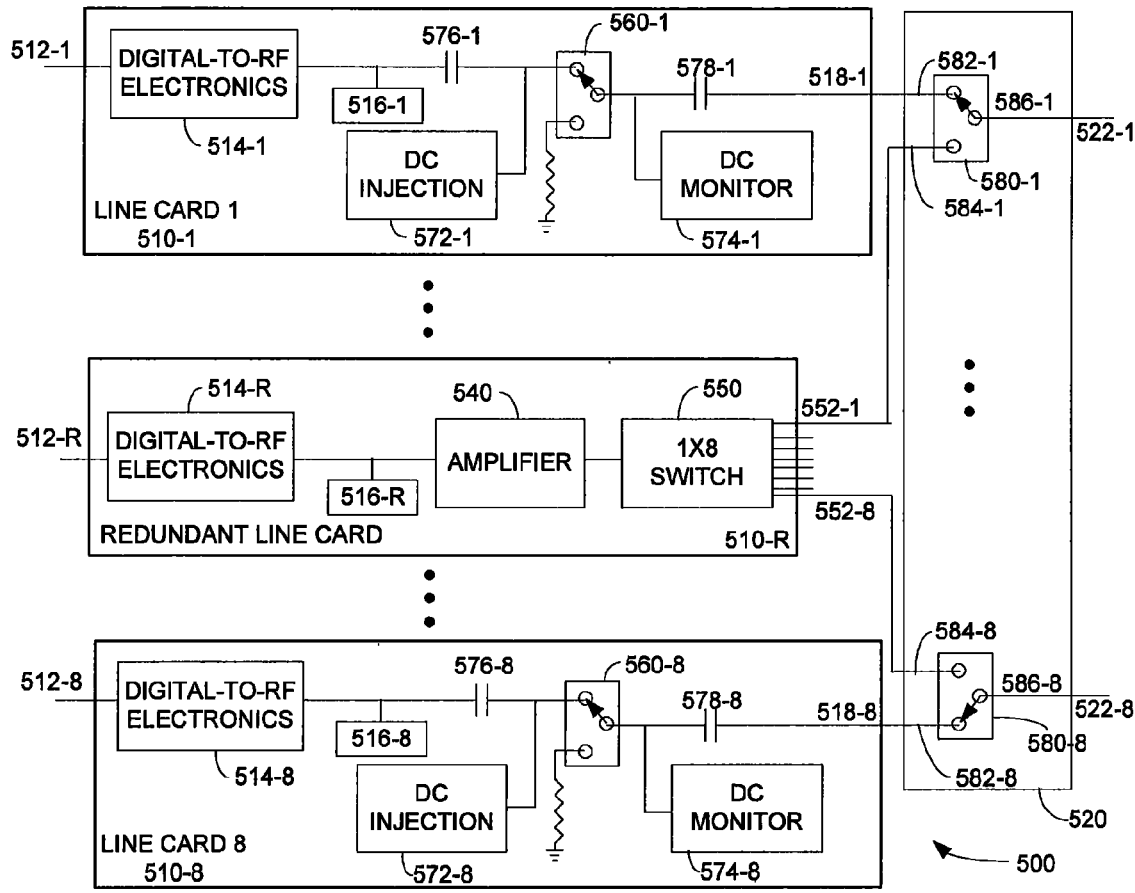
FIG. 5 is a schematic block of an RF transmitter according to further embodiments of the present invention.

FIG. 5 is a schematic block of an RF transmitter 500 according to further embodiments of the present invention. The RF transmitter 500 is similar to the RF transmitter 300 discussed above with reference to FIG. 3. However, in the RF transmitter 500 the directional couplers 330-1 through 330-8 that were included in the RF transmitter 300 of FIG. 3 are replaced with RF switches 580-1 through 580-8. All other components of the RF transmitter 500 may be identical to their corresponding components in the RF transmitter 300 of FIG. 3 (and have reference numerals that are offset by 200 from their corresponding components in the RF transmitter 300), and hence further description of these components will be omitted.

The RF switches 580-1 through 580-8 may be implemented, for example, using RF relays that are identical to the relay 200 depicted in FIG. 2. The relays 580 each include a first input port 582, a second input port 584, an output port 586 and a control port (not shown). The RF output port 518 of each primary line card 510 is connected to the first input port 582 of a respective one of the RF switches 580. A respective one of the output ports 552 of the 1×8 RF switch 550 is connected to the second input port 584 of each RF switch 580. The output port 586 of each RF switch 580 is connected to a respective one of the RF output ports 522 of the RF backplane 520. During normal operation, each switch 580 is set to connect the first input port 582 to the output port 586 so that the output of the digital-to-RF electronics module 514 on each of the primary line cards 510 is fed to the RF output ports 522 of the RF backplane 520. If, however, one of the primary line cards 510 fails, the corresponding RF relay 580 is set to connect the second input port 584 thereof to output port 586 and the digital data stream is switched to the redundant line card 510-R in the manner described previously (and the matched termination 560 on the failed primary line card 510 is also reset).

The RF transmitter 500 of FIG. 5 may exhibit less signal loss as compared to the RF transmitter 300, as the RF relays 580 have a significantly smaller insertion loss as compared to the directional couplers 330 included in the RF transmitter 300. However, as noted above, the RF relays 580 are more susceptible to failure than the directional couplers 330 and, more importantly, the RF relays 580 are located downstream of both the RF power detectors 516 and the RF monitoring circuit 570. As such, if one of the RF relays 580 fails, this failure may only be discovered after complaints of service outages are received from subscribers. As noted above, this is generally considered to be unacceptable.

Figure 6:
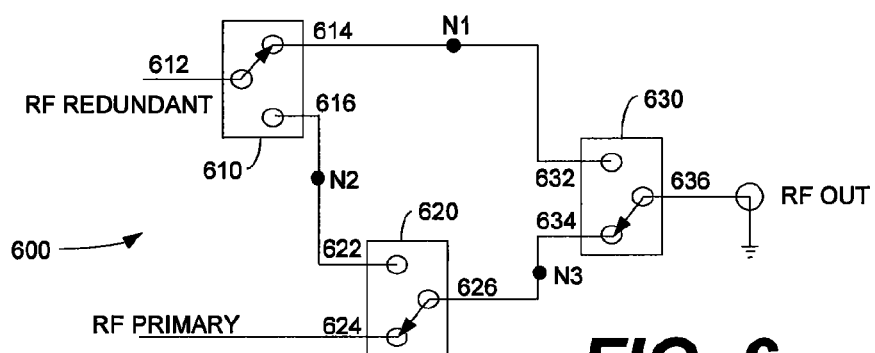
FIG. 6 is a block diagram of a switch circuit for an RF backplane according to further embodiments of the present invention.

FIG. 6 is a block diagram of a switch circuit 600 for an RF backplane according to further embodiments of the present invention. The switch circuit 600 may be used in place of each of the RF relays 580 that are included in the RF backplane 520 of the RF transmitter 500 of FIG. 5. The use of the switch circuit 600 may reduce the risk that failure of one of the RF relays 580 results in service outages. The switch 600 may also be used in locations other than the RF backplane.

As shown in FIG. 6, the switch circuit 600 includes three RF relays (or other switches) 610, 620, 630. An RF signal from a redundant line card is connected to the input port 612 of relay 610. The first output port 614 of relay 610 is connected to the first input port 632 of relay 630. The second output port 614 of relay 610 is connected to the first input port 622 of relay 620. The second input port 624 of relay 620 is connected to an RF output of a primary line card. The output port 626 of relay 620 is connected to the second input port 634 of relay 630. The output port 636 of relay 630 acts as the RF output of the switch circuit 600. Nodes N1, N2 and N3 are also depicted in FIG. 6 on the transmission paths between the relays 610, 620, 630. The nodes N1, N2 and N3 may simply be reference points along these transmission lines that may be used to clarify the connections between relays. For example, as shown in FIG. 6, the first output port 614 of relay 610 is connected to the first node N1, and the first input port 632 of relay 630 is also connected to node N1. Accordingly, the first output port 614 of relay 610 is connected to the first input port 632 of relay 630.

During normal operation, the three relays 610, 620, 630 may be set in the positions shown in FIG. 6 (alternatively, relay 610 may be set in its other position). In this configuration, the RF signal from the primary line card is passed to the RF output of switch circuit 600. However, there is a possibility that any of the three relays 610, 620, 630 may fail. Typically, when a relay fails, it is a failure of the mechanical switching mechanism 210 discussed above with reference to the relay 200 of FIG. 2. If the mechanical switching mechanism fails in one of the relays 610, 620, 630, the relay typically will still pass RF signals, but it will no longer be able to switch to its other position. The switching circuit 600 is designed so that if the mechanical switching mechanism fails in any one of the relays 610, 620, 630 the two other properly operating relays may be set so that either the primary line card or the redundant line card may be selectively connected to the RF output port of switch circuit 600.

Figure 6A:
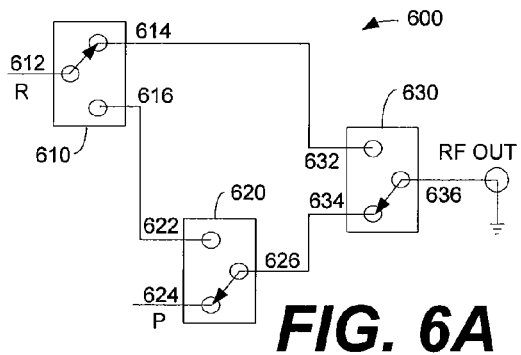
Figure 6B:
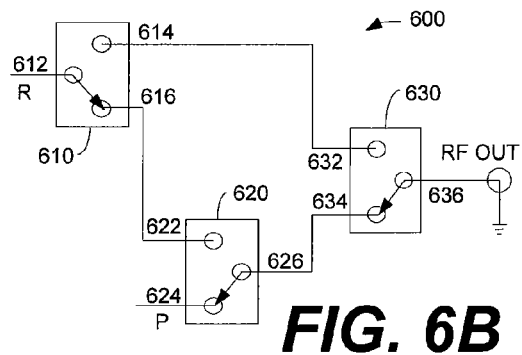
Figure 6C:
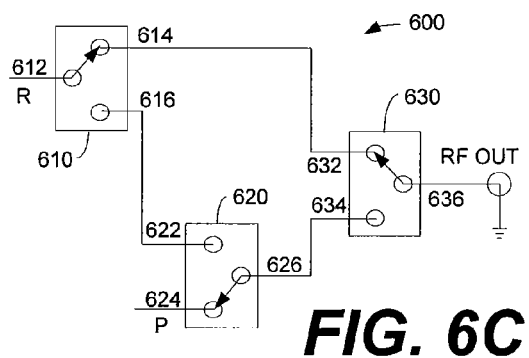
Figure 6D:
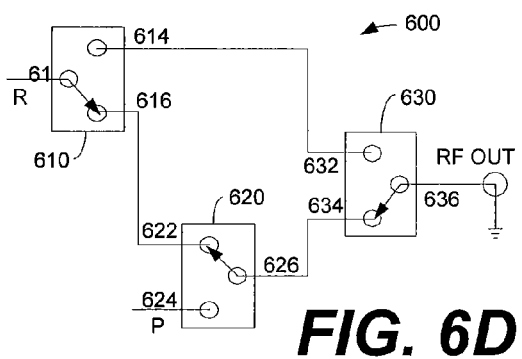

FIGS. 6A-6J illustrate the different configurations that the relays 610, 620, 630 may be set to in order to overcome the failure of the mechanical switching mechanism in any one of the relays 610, 620, 630. In particular, FIG. 6A illustrates the settings for relays 620 and 630 that may be used to connect a primary line card P to the RF output if the mechanical switching mechanism of relay 610 fails with input port 612 coupled to output port 614. FIG. 6B illustrates the settings for relays 620 and 630 that may be used to connect the primary line card P to the RF output if the mechanical switching mechanism of relay 610 fails with input port 612 coupled to output port 616. FIGS. 6C and 6D are identical to FIGS. 6A and 6B, respectively, except that FIGS. 6C and 6D illustrate the settings for relays 620 and 630 that may be used to connect the redundant line card R to the RF output when the mechanical switching mechanism of relay 610 fails so that it is stuck in its two possible positions.

Figure 6E:
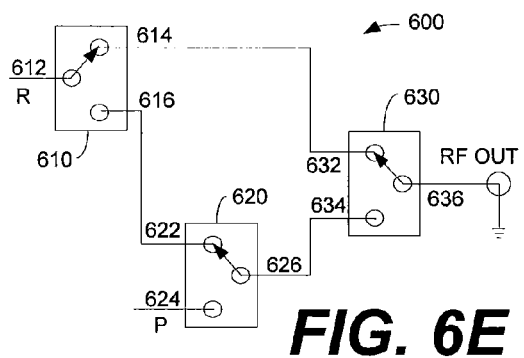
Figure 6F:
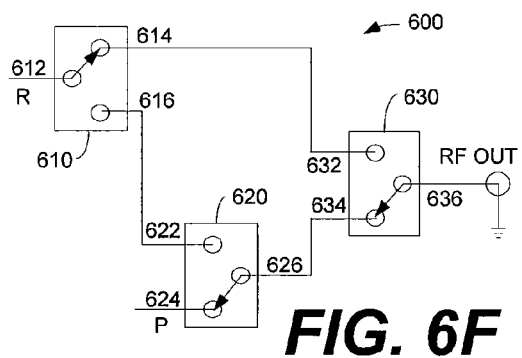

FIG. 6E illustrates the settings for relays 610 and 630 that may be used to connect the redundant line card R to the RF output if the mechanical switching mechanism of relay 620 fails with first input port 622 coupled to the output port 626. FIG. 6F illustrates the settings for relays 610 and 630 that may be used to connect the primary line card P to the RF output if the mechanical switching mechanism of relay 620 fails with the second input port 624 coupled to the output port 626. FIG. 6G illustrates the settings for relays 610 and 630 that may be used to connect the redundant line card R to the RF output if the mechanical switching mechanism of relay 620 fails with the second input port 624 coupled to the output port 626.

FIG. 6H illustrates the settings for relays 610 and 620 that may be used to connect the redundant line card R to the RF output if the mechanical switching mechanism of relay 630 fails with the first input port 632 coupled to the output port 636. FIG. 6I illustrates the settings for relays 610 and 630 that may be used to connect the primary line card P to the RF output if the mechanical switching mechanism of relay 630 fails with the second input port 634 coupled to the output port 636. FIG. 6J illustrates the settings for relays 610 and 620 that may be used to connect the redundant line card R to the RF output if the mechanical switching mechanism of relay 630 fails with the second input port 634 coupled to the output port 636.

Figure 7:
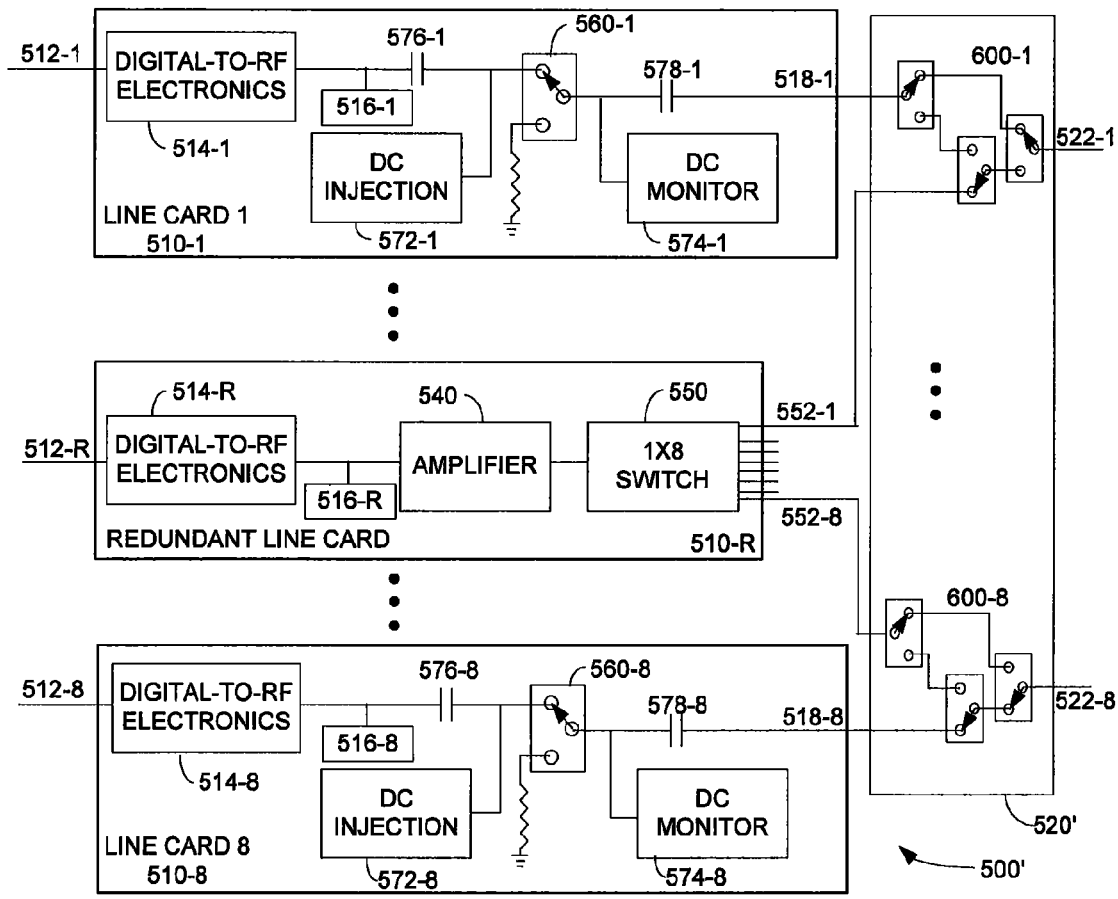
FIG. 7 is a schematic block of an RF transmitter according to further embodiments of the present invention that includes an RF backplane that has the switches of FIG. 6.

FIG. 7 is a schematic block of an RF transmitter 500' according to further embodiments of the present invention that includes an RF backplane 520' that has the switch circuits 600 of FIG. 6. As is readily apparent, the RF transmitter 500' is identical to the RF transmitter 500 of FIG. 5, except that each RF switch 580 is replaced with one of the switch circuits 600. Accordingly, further description of the structure or operation of RF transmitter 500' will be omitted.

It may be noted from the discussion of FIGS. 6A-6J above that there are instances when a failure of the mechanical switching mechanism of one of the relays 610, 620, 630 will limit the functionality of the RF transmitter. First, if relay 620 fails with the first input port 622 connected to the output port 626, the switch network 600 has no means for coupling the primary line card to the RF output. Second, if relay 630 fails with the first input port 632 connected to the output port 636, the switch network 600 again has no means for coupling the primary line card to the RF output.

Figure 8:
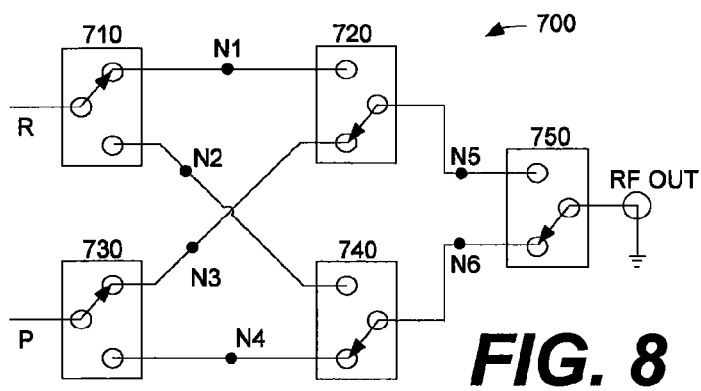
FIG. 8 is a block diagram of another switch circuit for an RF backplane according to further embodiments of the present invention.
Figure 9:
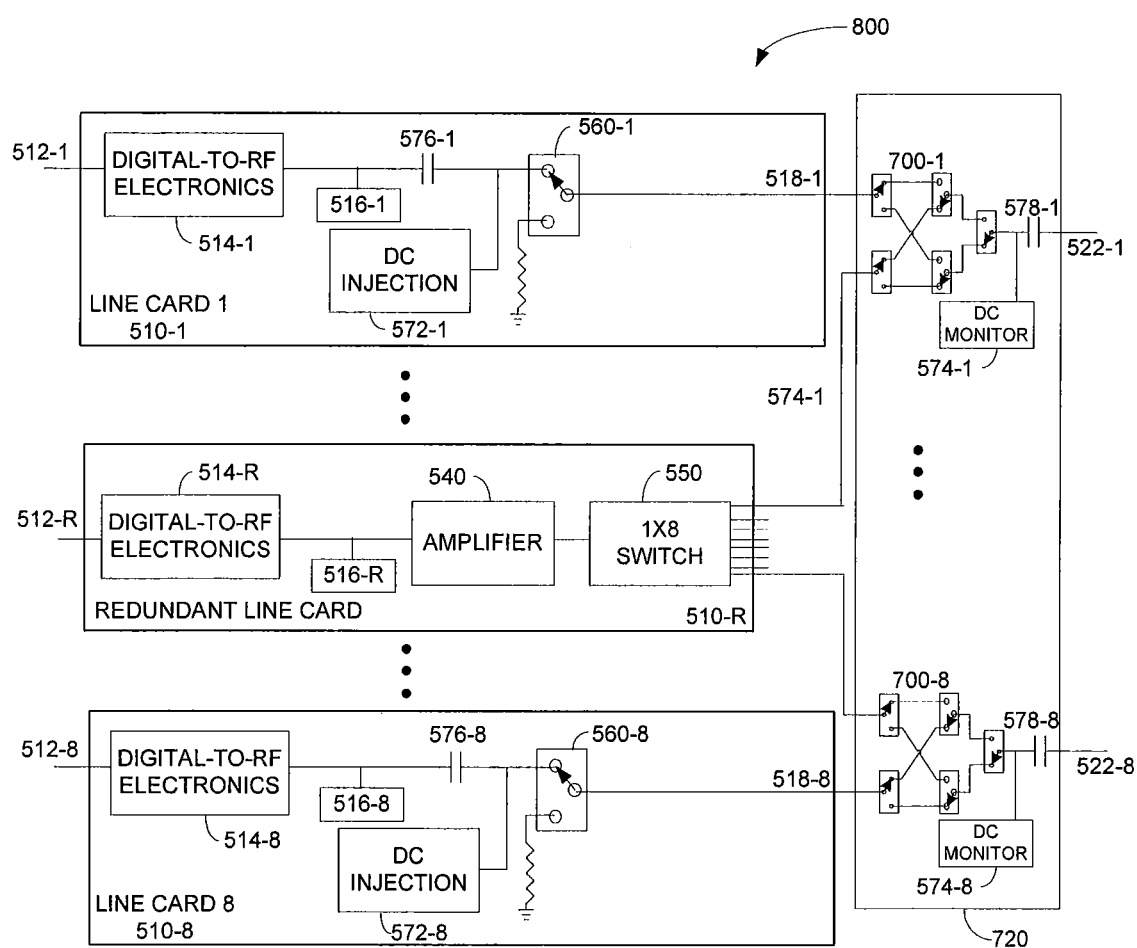
FIG. 9 is a schematic block diagram of an RF transmitter according to further embodiments of the present invention.

FIG. 8 is a block diagram of another switch circuit 700 for an RF backplane according to further embodiments of the present invention that does not have the above-mentioned shortcoming of the switch circuit 600. Switch circuit 700 includes a total of five relays 710, 720, 730, 740, 750. Switch circuit 700 may connect either the primary line card or the redundant line card to RF output by appropriately configuring the relays 710, 720, 730, 740, 750 if the mechanical switching mechanism of one of the five relays becomes stuck in one position. It will be appreciated that in further embodiments the RF transmitter 500' of FIG. 7 may be modified to include eight of the switch circuits 700 in place of the eight switch circuits 600. An RF transmitter 800 having this configuration is illustrated in FIG. 9, which is discussed below.

One potential shortcoming of the RF transmitters 500 and 500' described above (as well as the modified version of RF transmitter 500' that includes the switch circuits 700) is that if the mechanical switching mechanism of one of the relays in the RF backplane 520 fails, there may be no mechanism for the RF transmitter to sense this failure and, if switch circuits 600 or 700 are included in the RF backplane, reset the relays to automatically overcome such a relay failure. FIG. 9 is a schematic block of an RF transmitter 800 according to further embodiments of the present invention that addresses this shortcoming. As shown in FIG. 9, the DC monitoring circuits 574 of FIG. 7 are moved from the primary line cards 510 to the RF backplane 720 at the outputs of the respective switch circuits 700. With this change, the RF transmitter 800 can sense a failure in either the relays 560 or the switch circuits 700 and then reconfigure the relays and the downstream data feed to address such failures.

Figure 10:
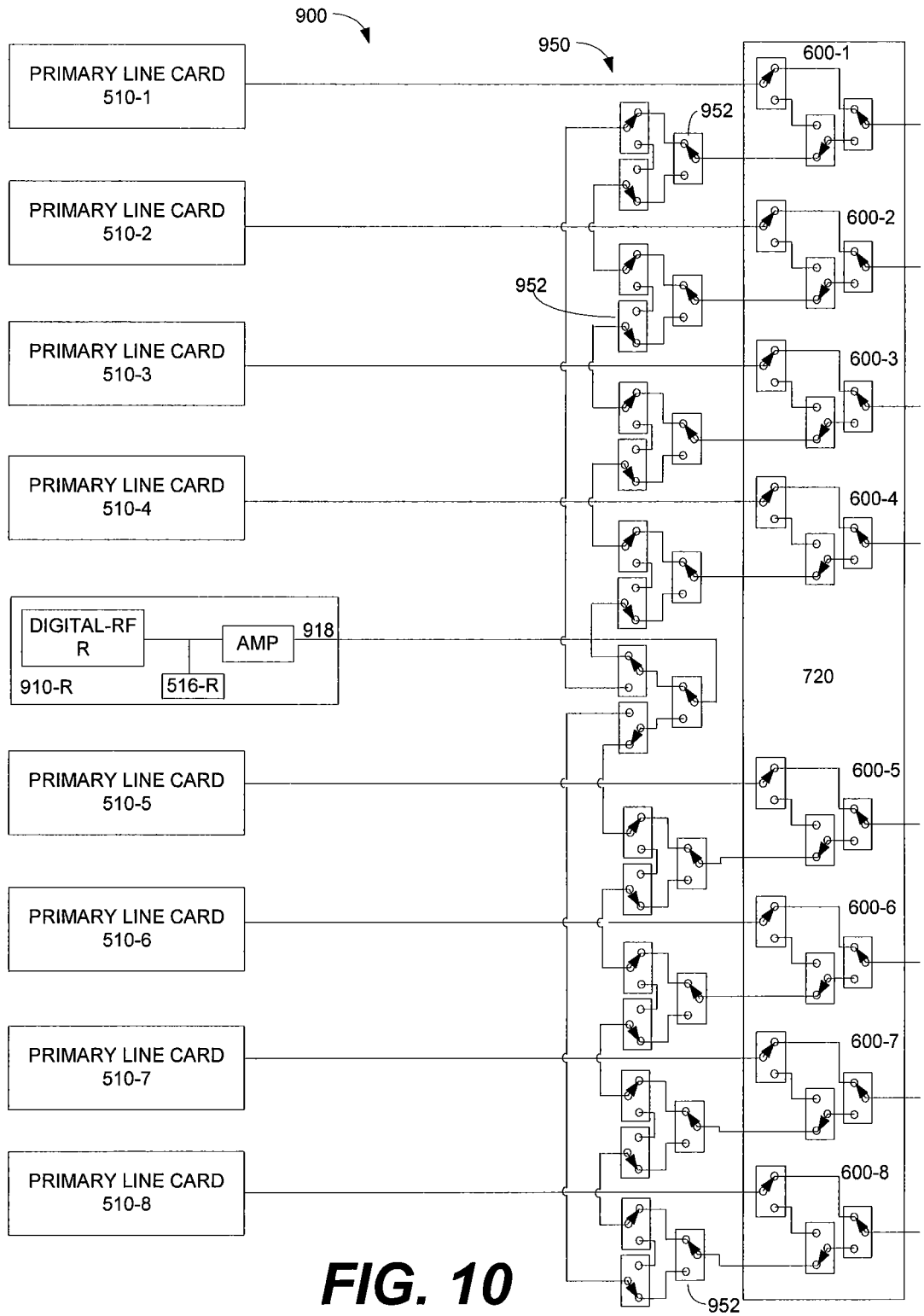
FIG. 10 is a schematic block diagram of another RF transmitter according to embodiments of the present invention.

FIG. 10 is a schematic block of an RF transmitter 900 according to still further embodiments of the present invention. The RF transmitter 900 is similar to the RF transmitter 500' discussed above with respect to FIG. 7, so the following description will focus on the differences between these two RF transmitters.

The primary line cards 510 may be identical to the primary line cards 510 in the RF transmitter 500' so they are shown as generic blocks in FIG. 10. The RF backplane 720 in RF transmitter 900 of FIG. 10 may be identical to the RF backplane 720 in the RF transmitter 500'. Accordingly, these components of the RF transmitter 900 will not be discussed further herein.

The redundant line card 910-R of RF transmitter 900 is similar to the redundant line card 510-R that is discussed above, but, the 1×8 switch 150 of redundant line card 510-R is replaced with a switch circuit 950 that is external to the redundant line card 910-R. As shown in FIG. 10, the switch circuit 950 includes twenty-seven relays 952 which are configured to allow the output 918-R of the redundant line card 910-R to be routed to the redundant input of any of the eight switch circuits 600. Notably, multiple paths are provided through the switch circuit 950 to the redundant input of any of the eight switch circuits 600, and hence failure of various of the relays 952 may be overcome by reconfiguring the switch circuit 900.

Figure 11:
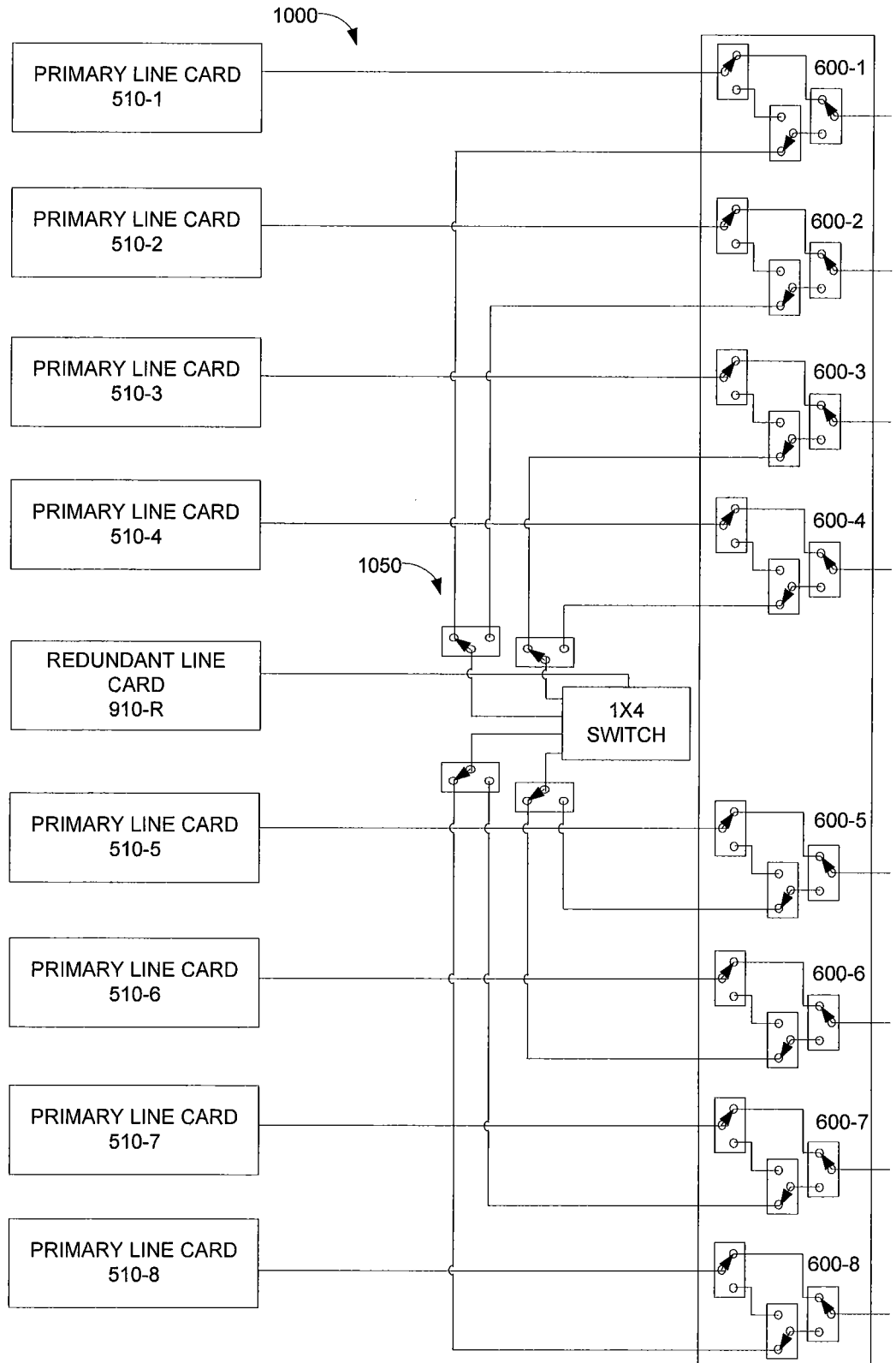
FIG. 11 is a schematic block diagram of an RF transmitter according to still further embodiments of the present invention.

FIG. 11 is a schematic block of an RF transmitter 1000 according to still further embodiments of the present invention. The RF transmitter 1000 uses a different switching circuit 1050 to connect the redundant line card 910-R to the switch circuits 600, but otherwise is identical to the RF transmitter 900 of FIG. 10 so further description thereof will be omitted.

Figure 12:
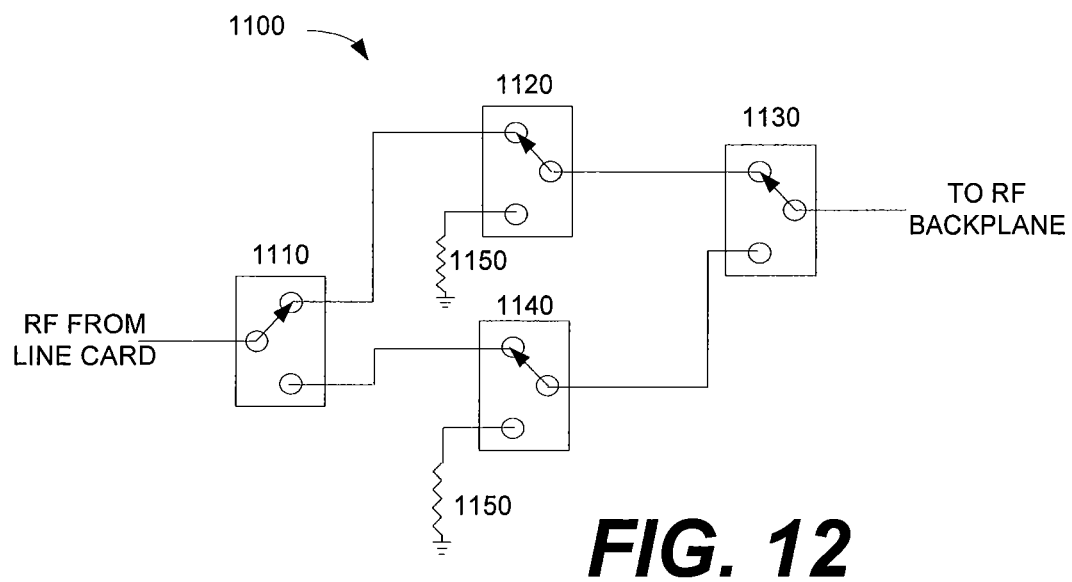
FIG. 12 is a block diagram of a switch circuit for a line card according to embodiments of the present invention.

FIG. 12 is a block diagram of a switch circuit 1100 for a primary line card according to embodiments of the present invention that may be used, for example, in any of the primary line cards of the above-described RF transmitters according to embodiments of the present invention. The switch circuit 1100 may be used in place of the matched termination relays that are provided on various of the primary line cards according to embodiments of the present invention.

Referring, for example, to FIG. 1, each primary line card 110 includes a matched termination relay 160 that may be used to set the impedance of the primary line card 110 to a preselected impedance level in the event that circuitry on the primary line card 110 fails and it is necessary to switch the downstream data feed to the redundant line card 110-R. One potential shortcoming of this design is that the relays 160 may also fail and, if this occurs, such failures will also require switching the downstream data feed to the redundant line card 110-R. Depending on the likelihood of any such failures, this may require the provision of extra redundant line cards.

According to further embodiments of the present invention, the matched termination relays that are included in the RF transmitters 100, 300, 500, 500', 800, 900 or 1000 (i.e., matched termination relays 160, 360, 560) may be replaced with the switch circuit 1100 of FIG. 12. The switch circuit 1100 includes four relays 1110, 1120, 1130, 1140. Relays 1120 and 1140 each have an input port that is connected to a matched termination 1150. If the mechanical switching mechanism of any of the relays 1110, 1120, 1130, 1140 fail the remaining relays may be reconfigured to ensure that an RF transmission path is provided through the switch circuit 1100 (i.e., from the input labeled "RF From Line Card" in FIG. 12 to the output labeled "To RF Backplane" in FIG. 12) while also allowing the output of the primary line card to be set to the matched termination resistance in the event that other electronics on the primary line card fail. Thus, by providing a more sophisticated matched termination circuit on the primary line cards, the number of redundant line cards required may potentially be reduced.

It will be appreciated that aspects of different embodiments of the RF transmitters and switch circuits disclosed herein may be incorporated into other embodiments, either as replacements for existing circuitry or as additional components in order to provide a plurality of additional embodiments. As one example, in the RF transmitter 800 discussed with reference to FIG. 9, the DC monitoring circuit is into the RF backplane. It will be appreciated that the same approach may be used in other embodiments such as, for example, in the RF transmitters of FIGS. 3, 5, 7, 10 and 11. As another example, the implementations for the switch that is associated with the redundant line card that are shown in the embodiments of FIGS. 10 and/or 11 could be used in any of the other RF transmitters disclosed herein. It will also be appreciated that circuitry can be left off of some of the RF transmitters disclosed herein. By way of example, the matched termination relays 560 may be omitted in some or all of the RF transmitters of FIGS. 5, 7 and 9-11 in further embodiments.

It will also be appreciated that numerous aspects of the RF transmitters shown herein are exemplary in nature, and not limiting to embodiments of the present invention. For example, all of the RF transmitters shown herein have eight primary line cards and one redundant line card. These numbers of line cards were arbitrarily chosen and are not limiting. Likewise, to simplify the drawings, each line card is shown as having a single input port and a single RF output port. In practice, it is far more typical that multiple input and output ports will be provided per line card. As yet another example, the RF transmitters are shown as having an RF backplane in which facilitates selectively connecting either a primary line card or the redundant line card to each RF output port on the RF backplane. It will be appreciated that this functionality may be accomplished in other elements of the RF transmitter (e.g., in an RF midplane). It will also be appreciated that in some embodiments the outputs of the RF midplanes and/or RF backplanes may be optical outputs as opposed to RF outputs.

While not shown in the drawings, it will be appreciated that the RF transmitters discussed herein may have a controller such as, for example, a microprocessor or an ASIC that controls various operations of the transmitter such as the settings on the switches, the routing of the downstream data feeds to the line cards, etc. This controller may also receive control signals such as, for example, control signals from the DC monitoring circuits included in embodiments of the present invention. The controller may, in some embodiments, be configured to automatically detect potential failures of components of the RF transmitter and may also be configured to automatically reconfigure other components when such failures are detected.

In some embodiments, a DC signal is injected on the RF signal path and downstream of the injection point a DC signal detector is used to sense whether or not the DC signal is present in order to monitor whether various components of the RF transmitter are operating properly. It will be appreciated that in other embodiments alternating current ("AC") signals may be used instead of the DC signal, so long as the AC signals will not substantially interfere with the RF signals. As one example, very low frequency AC signals could be used in other embodiments. Testing has shown that AC injection signals also work well.

The present invention has been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. are used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements and/or components, but do not preclude the presence or addition of one or more other features, operations, elements, components and/or groups thereof.

In the drawings and specification, there have been disclosed typical embodiments of the invention and, although specific terms are employed, they are used in a generic and descriptive sense only and not for purposes of limitation, the scope of the invention being set forth in the following claims.

The invention claimed is:

1. A radio frequency ("RF") transmitter, comprising
a digital-to-RF electronics module that is configured to receive an input data stream and output an RF signal containing at least some of the input data stream;
a switch having a first input port that connects to an output of the digital-to-RF electronics module, a second input port that connects to a matched termination, and an output port that connects to a communications network, the output port selectively connectable to one of the first input port or the second input port;
a DC injection circuit that is configured to inject a DC signal at a first node on a first RF transmission path that connects the output of the digital-to-RF electronics module to the first input port of the switch; and
a DC monitoring circuit coupled to a second node on a second RF transmission path that connects the output port of the switch to the communications network, wherein the DC monitoring circuit is configured to sense if the DC signal is present at the second node,
wherein the digital-to-RF electronics module, the switch, the DC injection circuit and the DC monitoring circuit are all implemented on a first primary line card.

2. The RF transmitter of claim 1, wherein the switch is configured to connect the output port of the switch to the second input port of the switch in response to failure of the first primary line card so that the output of the digital-to-RF electronics module of the failed first primary line card will not be part of an RF signal path of the communications network.

3. The RF transmitter of claim 2, further comprising a first DC block capacitor on the first primary line card between the output of the digital-to-RF electronics module and the first node and a second DC block capacitor on the first primary line card between the second node and the communications network.

4. The RF transmitter of claim 2, wherein the DC injection circuit generates a reference DC voltage that is input to the DC monitoring circuit along a reference voltage transmission path.

5. The RF transmitter of claim 2, wherein the DC monitoring circuit includes a Schmidt trigger inverter.

6. The RF transmitter of claim 2, wherein the RF transmitter includes a plurality of additional primary line cards, each of which includes a separate DC injection circuit and a separate DC monitoring circuit.

7. The RF transmitter of claim 1, wherein the switch is an RF relay and the matched termination comprises a resistance that is coupled to a ground voltage, where a value the resistance is selected to set an impedance at the output port of the switch to a pre-selected level.

8. A radio frequency ("RF") transmitter, comprising
a digital-to-RF electronics module that is configured to receive an input data stream and output an RF signal containing at least some of the input data stream;
a switch having a first input port that is coupled to an output of the digital-to-RF electronics module, a second input port that is coupled to a matched termination, and an output port that is coupled to a communications network;
a DC injection circuit that is configured to inject a DC signal at a first node on a first RF transmission path that connects the output of the digital-to-RF electronics module to the first input port of the switch; and
a DC monitoring circuit that is configured to sense if a DC signal is present on a second RF transmission path that connects the output port of the switch to the communications network,
the RF transmitter further comprising a switch network that is coupled to the output port of the switch, the switch network comprising:
a first switch having an input coupled to the output port of the switch, a first output coupled to a second node and a second output coupled to a third node;
a second switch having a first input coupled to a redundant RF source, a second input coupled to the third node and an output coupled to a fourth node; and
a third switch having a first input coupled to the second node, a second input coupled to the fourth node, and an output.

9. The RF transmitter of claim 8, wherein the first, second and third switches are controlled by respective control signals.

10. The RF transmitter of claim 8, wherein the RF transmitter comprises a quadrature amplitude modulation transmitter, the digital-to-RF electronics module is part of a primary line card and the redundant RF source is part of a redundant line card.

11. The RF transmitter of claim 8, wherein the DC monitoring circuit includes a Schmidt trigger inverter.

12. The RF transmitter of claim 8, wherein the digital-to-RF electronics module, the switch, the DC injection circuit and the DC monitoring circuit are all implemented on a first primary line card, and wherein the RF transmitter includes a plurality of additional primary line cards, each of which includes a separate DC injection circuit and a separate DC monitoring circuit.

13. The RF transmitter of claim 8, wherein the switch is an RF relay and the matched termination comprises a resistance that is coupled to a ground voltage, where a value the resistance is selected to set an impedance at the output port of the switch to a pre-selected level.

14. A radio frequency ("RF") transmitter, comprising
a digital-to-RF electronics module that is configured to receive an input data stream and output an RF signal containing at least some of the input data stream;
a switch having a first input port that is coupled to an output of the digital-to-RF electronics module, a second input port that is coupled to a matched termination, and an output port that is coupled to a communications network;
a DC injection circuit that is configured to inject a DC signal at a first node on a first RF transmission path that connects the output of the digital-to-RF electronics module to the first input port of the switch; and
a DC monitoring circuit that is configured to sense if a DC signal is present on a second RF transmission path that connects the output port of the switch to the communications network,
the RF transmitter further comprising a switch network that is coupled to the output port of the switch, the switch network comprising:
a first switch having an input coupled to the output port of the switch, a first output coupled to a second node and a second output coupled to a third node;

a second switch having a first input coupled to the second node, a second input coupled to a fourth node and an output coupled to a sixth node;

a third switch having an input coupled to a second digital-to-RF electronics module, a first output coupled to the fourth node and a second output coupled to a fifth node;

a fourth switch having a first input coupled to the third node, a second input coupled to the fifth node and an output coupled to a seventh node; and a fifth switch having a first input coupled to the sixth node, a second input coupled to the seventh node and an output.

15. The RF transmitter of claim 14, further comprising a switching circuit between the second digital-to-RF electronics module and the third switch, wherein the switching circuit has at least two RF paths that connect the second digital-to-RF electronics module to the input of the third switch.

16. The RF transmitter of claim 14, wherein the digital-to-RF electronics module, the switch, the DC injection circuit and the DC monitoring circuit are all implemented on a first primary line card, and wherein the RF transmitter includes a plurality of additional primary line cards, each of which includes a separate DC injection circuit and a separate DC monitoring circuit.

17. The RF transmitter of claim 14, wherein the switch is an RF relay and the matched termination comprises a resistance that is coupled to a ground voltage, where a value the resistance is selected to set an impedance at the output port of the switch to a pre-selected level.

* * * * *